(12) United States Patent
Dunn et al.

(10) Patent No.: US 11,736,217 B2
(45) Date of Patent: Aug. 22, 2023

(54) ON DEMAND DATA DELIVERY IN A WIRELESS NETWORK

(71) Applicant: Harris Global Communications, Inc., Rochester, NY (US)

(72) Inventors: Ethan Dunn, Fairport, NY (US); Michael Woodruff, Macedon, NY (US); Alexander Peach, Rochester, NY (US); Nick Van Stralen, Bloomfield, NY (US)

(73) Assignee: HARRIS GLOBAL COMMUNICATIONS, INC., Rochester, NY (US)

( * ) Notice: Subject to any disclaimer, the term of this patent is extended or adjusted under 35 U.S.C. 154(b) by 185 days.

(21) Appl. No.: 17/347,208

(22) Filed: Jun. 14, 2021

(65) Prior Publication Data
US 2022/0399948 A1     Dec. 15, 2022

(51) Int. Cl.
| H04J 3/16 | (2006.01) |
| H04W 72/04 | (2023.01) |
| H04L 12/18 | (2006.01) |
| H04W 72/0446 | (2023.01) |
| H04W 84/18 | (2009.01) |

(52) U.S. Cl.
CPC .......... *H04J 3/1694* (2013.01); *H04L 12/189* (2013.01); *H04W 72/0446* (2013.01); *H04W 84/18* (2013.01)

(58) Field of Classification Search
CPC .. H04J 3/1694; H04L 12/189; H04W 72/0446
USPC ......................................................... 370/336
See application file for complete search history.

(56) References Cited

U.S. PATENT DOCUMENTS

| 7,941,149 | B2 * | 5/2011 | Wang | ..................... H04L 47/829 455/445 |
| 2008/0107044 | A1 | 5/2008 | Blair et al. | |
| 2008/0310390 | A1 | 12/2008 | Pun et al. | |
| 2012/0182867 | A1 * | 7/2012 | Farrag | ...................... H04J 3/16 370/230 |

(Continued)

FOREIGN PATENT DOCUMENTS

WO    WO-2009148410 A1 * 12/2009    ............. H04L 45/04

OTHER PUBLICATIONS

Extended European Search Report for Corresponding European Patent Application No. 22174006.1, dated Oct. 13, 2022 (10 pages).

*Primary Examiner* — Faisal Choudhury
(74) *Attorney, Agent, or Firm* — Fox Rothschild LLP

(57) ABSTRACT

On-demand allocation of communication capacity in a Mobile ad hoc Network (MANET) involves initiating in a first node of the MANET, a request for network communication capacity. The request is initiated by wirelessly transmitting an access request in a first epoch, during an access request time slot of a TDMA waveform. The access request is directed to one-hop neighbor nodes with which the first node can communicate directly. The first node determines whether the access request has been granted based on one or more responses received from the one-hop neighbor nodes. These responses include an indication by each of the one-hop neighbor nodes regarding their availability to accommodate the access request. The first node subsequently uses network communication capacity granted to it for communicating data.

22 Claims, 9 Drawing Sheets

(56) References Cited

U.S. PATENT DOCUMENTS

2013/0100942 A1   4/2013  Rudnick et al.
2020/0287834 A1*  9/2020  Ramanathan ..... H04W 28/0284

* cited by examiner

ON DEMAND DATA DELIVERY IN A WIRELESS NETWORK

BACKGROUND

Statement of the Technical Field

The inventive arrangements relate to computer networks, and more particularly to methods and systems for multi-hop data delivery in broadcast wireless networks.

Description of the Related Art

A mobile ad-hoc network (MANET) is a wireless self-configuring network in which data is communicated from one or more source nodes to at least one destination node in a series of wireless hops which can traverse one or more nodes. New nodes can be configured to automatically join with an existing network when in wireless range of the one or more nodes that form the MANET. The nodes forming a MANET can be stationary or mobile. Further, each node in the network is commonly configured so that it can function in the role of a terminal node and/or a router for other nodes in the network. An important aspect of a MANET is that the nodes are self-organized and without a fixed topology. As a result of the foregoing, the topology of a MANET is often highly variable and can change in ways that are difficult to predict.

In multi-hop military MANET networks, most nodes in the network do not need to transport any data while others have considerable data demands and it is a priori unknown which nodes require access. Further, most data in military MANET networks needs to be distributed to all participating nodes in the network. There exist many algorithms for assigning capacity to users, but existing methods are deficient in that they require too much background traffic, take too long to acquire and gain access to channel resources, and they are inefficient in their use of the over-the-air (OTA) resources. Other limitations of such algorithms are that end-to-end data transport latencies are relatively long, and they often require use of a centralized node to arbitrate and assign access.

SUMMARY

Embodiments concern a method and system for on-demand allocation of communication capacity in a Mobile ad hoc Network (MANET) utilizing a Time Division Multiple Access (TDMA) waveform. The method involves initiating in a first node of the MANET, a request for network communication capacity. The request is initiated by wirelessly transmitting in a first epoch, during a predetermined access request time slot of the TDMA waveform, an access request directed to one or more one-hop neighbor nodes with which the first node can communicate directly. Thereafter, the first node determines whether the access request has been granted based on one or more responses received from one or more of the one-hop neighbor nodes. These responses will include an indication specifying a determination by each of the one-hop neighbor nodes regarding their availability to accommodate the access request. The method continues with a further action on the part of the first node which involves using the network communication capacity by the first node to communicate data if the access request has been granted.

According to one aspect, the one or more responses received from the one or more one-hop neighbor nodes in a second and third TDMA slot subsequent to the access request time slot. For example, in a scenario described herein, the first node reserves the second TDMA slot as a denial time slot. During such time slot, the first node concurrently receives from one or more of the one-hop neighbor nodes any messages comprising a denial of the access request. In a specific embodiment disclosed herein, the denial time slot can be the same time slot as the access request time slot but residing in a second epoch subsequent to the first epoch. The first node can reserve the third TDMA slot as a grant time slot. During such grant time slot, the first node concurrently receives from one or more of the one-hop neighbor nodes any messages comprising a grant of the access request. In one particular embodiment disclosed herein, the grant time slot is the same time slot as the access request time slot but resides in a third epoch subsequent to the first epoch.

The first node described above can advantageously determine one or more units of potentially available network capacity before initiating any access request. For example, the first node can do so by consulting network usage data stored at the first node. Further, the generated access request will include a reservation of network communication capacity for the first node to facilitate transmission of data to the one or more one-hop neighbor nodes, and for a data relay operation to be performed by the one or more one-hop neighbor nodes. The reservation of network communication capacity for the data relay operation can in some scenarios involve accommodation for two or more neighbor nodes to concurrently transmit in accordance with an avalanche mode of transmission.

In a solution for network communications which is described herein, the access request which is generated by the first node is advantageously a request for a set of time slots. The set of time slots in such a scenario will include a multiple of three time slots. For example, the request can involve 3, 6, 9 or 12 time slots. Notably, by defining the access request to include a multiple of three time slots, the first node ensures that the network resources are sufficient to provide unlimited hop forwarding in the MANET.

According to a further aspect, the access request initiated by the first node can be for one or more dataslots of network capacity. In such a scenario, each of the one or more dataslots is mapped to one or more TDMA time slots. For example, in some scenarios each dataslot maps to exactly one TDMA time slot. In other scenarios, each dataslot can map to a plurality of time slots. For example, the TDMA waveform can be time-domain multiplexed into a plurality of multiplex channels, and each dataslot in such a scenario can be mapped to only one of the plurality of multiplex channels.

The solution also concerns a network node which can facilitate on-demand allocation of communication capacity in a Mobile ad hoc Network (MANET) as described herein. Such a network node can include a transceiver configured to facilitate wireless communications with a plurality of nodes forming the MANET and a processing unit configured to perform certain operations as described above. For example, the processing unit can initiate a request for network communication capacity by causing the transceiver to wirelessly transmit an access request. The access can be transmitted in a first epoch, during a predetermined access request time slot of the TDMA waveform. The access request can be directed to one or more one-hop neighbor nodes with which the network node can communicate directly;

The processing unit can be further configured to determine whether the access request has been granted. This determination can be based on at least one response received by said transceiver from one or more of the one-hop neighbor nodes. Such responses will indicates a determination by each of the one-hop neighbor nodes regarding their availability to accommodate the access request. Thereafter, the network node will use its transceiver, and the network communication capacity which has been granted to such node. For example, the network node can use the transceiver and the network capacity allocated to it for purposes of communicating data traffic.

In a network node as described herein, the processing unit is advantageously configured to receive the at least one response from the one or more one-hop neighbor nodes in a second and third TDMA slot subsequent to the access request time slot. For example, the processing unit can reserve the second TDMA slot as a denial time slot for concurrently receiving any denial of the access request from the one or more neighbor nodes. In some scenarios, the denial time slot may be the same time slot as the access request time slot but residing in a second epoch subsequent to the first epoch. The processing unit can also reserve the third TDMA slot as a grant time slot. This grant time slot is reserved for receiving any grant of the access request concurrently from the one or more neighbor nodes. In some scenarios, the grant time slot is the same time slot as the access request time slot but residing in a third epoch subsequent to the first epoch.

The processing unit can be configured to perform certain actions relating to the access request. For example, it can determine one or more units of potentially available network capacity before initiating the access request by consulting network usage data recorded in a data store of the network node. The access request generated by the processing can include a reservation of network communication capacity for the network node. Such reservation can be chosen by the processing unit to facilitate transmission of data to the one or more one-hop neighbor nodes, and for a data relay operation to be performed by the one or more one-hop neighbor nodes. For example, the processing unit can be configured to generate an access request that is for a set of time slots. The set of time slots requested can be a multiple of three time slots to ensure sufficient to provide unlimited hop forwarding in the MANET.

The processing unit can also be configured so that the access request is for one or more dataslots of network capacity. Such dataslots can be selected so that they map to one or more TDMA time slots as described above.

The solution can also involve a method in which a first node of a plurality of nodes comprising the MANET, generates a access request for at least one dataslot of network communication capacity, where the access request indicates a multiple of three time slots of the TDMA waveform. This request can be wirelessly transmitted (e.g., to one or more neighbor nodes). Thereafter the first node can then determine whether the access request has been granted based on at least one response received. The first node then use the at least one dataslot specified by the access request to communicate data with unlimited hop forwarding from the first node to any of the plurality of nodes within the MANET. In some scenarios, each of the at least one dataslots is mapped to one or more of the time slots.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Embodiments disclosed herein may provide certain advantages in a MANET communication network. In particular, certain embodiments can improve performance of such networks with a channel access scheme that is efficient in delivering low-latency all-informed (multicast) data in a multi-hop MANET network. Further, a distributed data slot allocation mechanism is provided that that minimizes background traffic or is not dependent on a particular special node.

Figure 1:
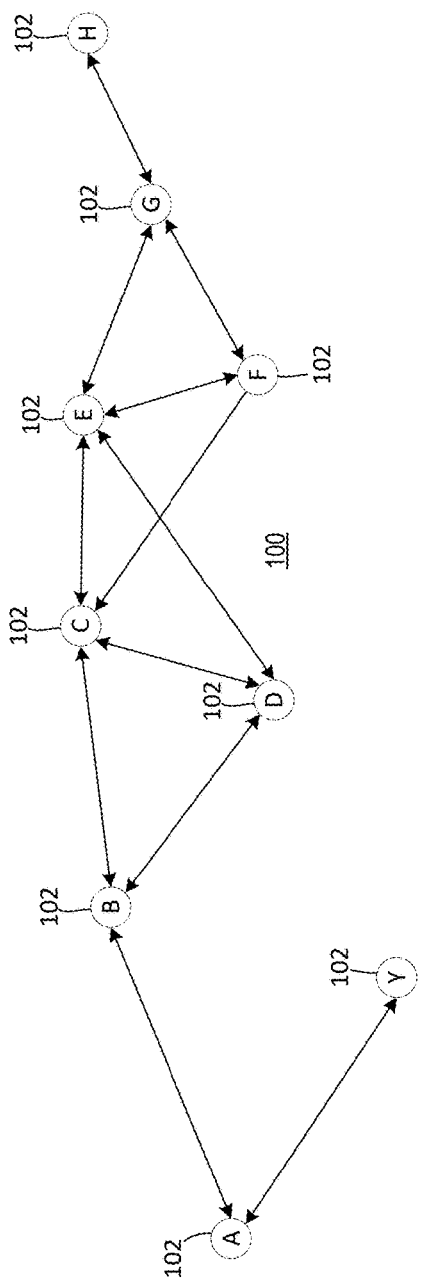
FIG. 1 is a drawing that is useful for understanding a multi-hop MANET network comprising a plurality of nodes.

An example of a mobile ad-hoc network (MANET) 100 is shown in FIG. 1. The MANET is a wireless self-configuring network in which data is communicated between a plurality of nodes 102 in a series of one or more wireless hops from a particular node 102 that is the source of a communication to a different node 102 that is an intended recipient of a particular communication. The nodes 102 which comprise the network 100 can be stationary or mobile and it is understood that new nodes 102 can join the network automatically when in wireless range of any of the existing nodes comprising the network. In a network access system described herein, each node 102 comprising the network 100 can function in the role of a terminal node and/or a router for other nodes in the network. As explained herein in further detail, there is no single node that controls the network operation or prioritization of resources. Further, although a particular example of a network topology is shown in FIG.

1, it should be understood that a MANET 100 as described herein is self-organized and therefore can have any topology.

Figure 2:
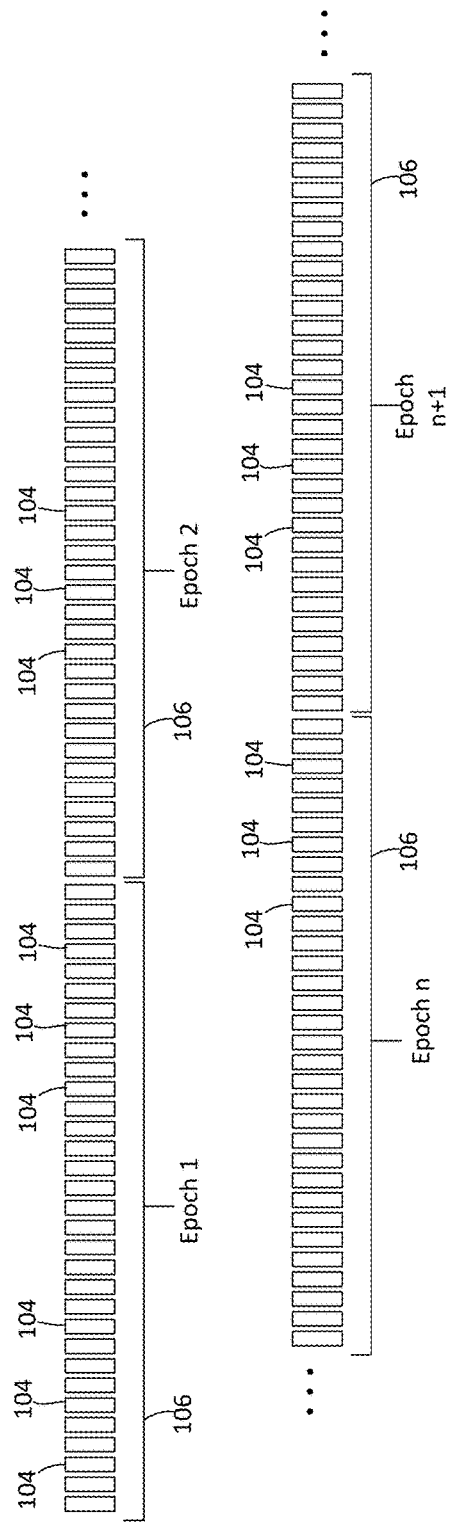
FIG. 2 is a drawing that is useful for understanding certain concepts of a time division multiple access channel sharing arrangement.

According to one aspect of a MANET described herein can operate in accordance with a time division multiple access (TDMA) arrangement. With reference to FIG. 2, it will be understood that a particular RF channel in a TDMA based system can be divided into a plurality of time slots 104 which are organized within a series of successive epochs 106. Each epoch associated with the TDMA waveform is comprised of a predefined number of time slots 104. The epochs 106 can in some scenarios be numbered so that different epochs can be individually identified (e.g., epoch 1, epoch 2, . . . epoch n, epoch n+1 . . . ). In a TDMA based system as described herein the plurality of nodes 102 share and use the same RF channel. This is accomplished by assigning nodes 102 permission to use various different time slots of an RF channel for certain specified purposes.

Figure 3:
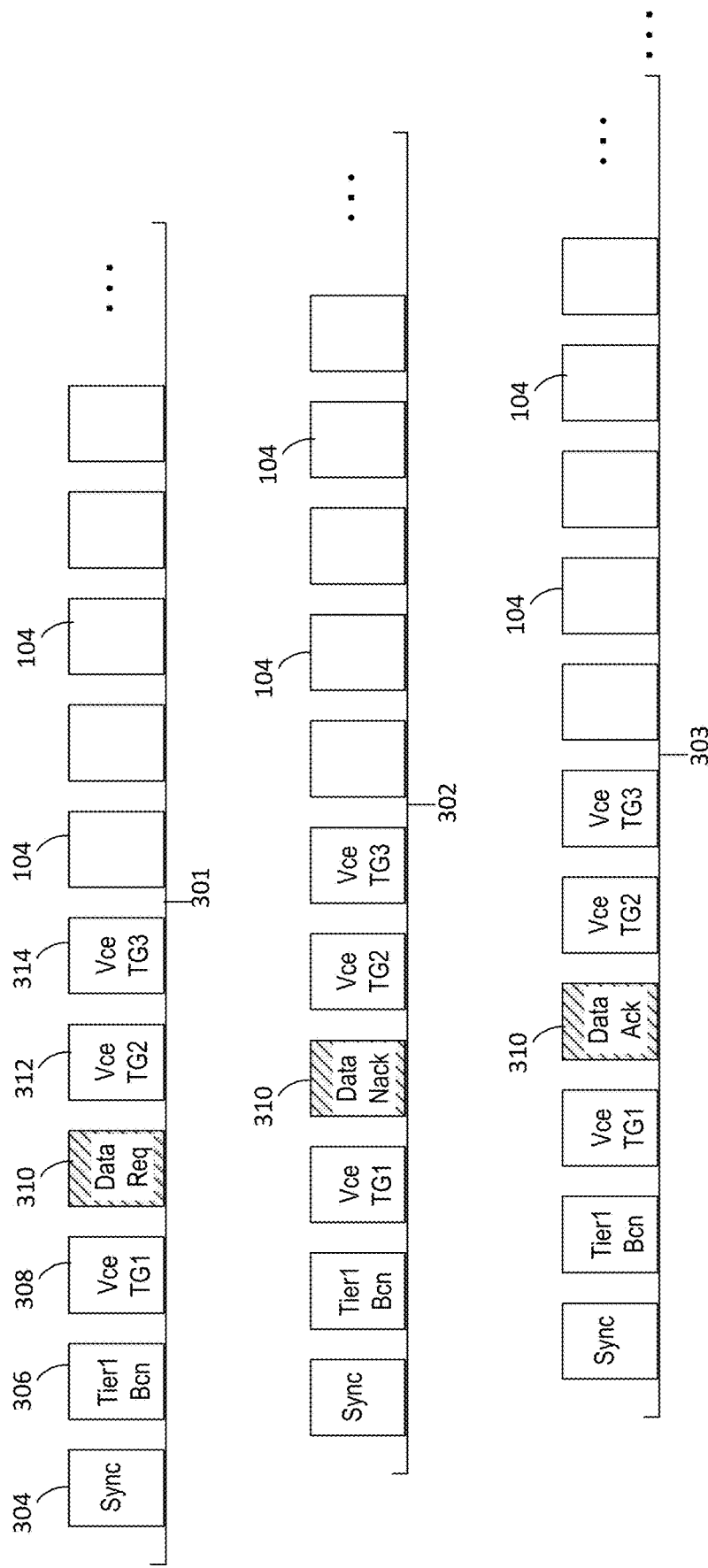
FIG. 3 is a drawing that is useful for understanding how a network node in a MANET network can request access to certain network resources.

FIG. 3 shows a time-expanded view of a succession or series of three epochs 301, 302, 303 comprising a TDMA waveform used in a MANET. It can be observed that within each epoch, certain time slots are designated for certain predetermined purposes. For example, in some scenarios a Sync time slot 304 can contain time synchronization data to facilitate timing alignment of the various nodes 102 comprising the network. Similarly, a Tier1 Bcn time slot 306 can be used for broadcasting a predetermined beacon signal that can be detected and used by nodes 102 that seek to join an existing network 100. Certain time slots can also be reserved for certain types of traffic. For example, in FIG. 3, each epoch 106 includes time slots 308, 312, 314 which are reserved for digital voice communications among certain talk groups (e.g., TG1, TG2 and TG3). In the scenario shown, these time slots 308, 312, 314 are respectively labeled Vce TG1, Vce TG2, and Vce TG3. It should be understood that the specific time slots described herein for these purposes are not critical and alternative assignments are possible to facilitate various network control operations. Likewise it should be understood that not all networks will necessarily include the same control slots.

Time slots 102 which are not reserved for specific functions such as network control can be used by the nodes 102 for communicating data traffic. In a MANET network, some individual nodes 102 only need to transport data on an infrequent basis. Other nodes have considerable data demands and it is a priori unknown which nodes require access. Accordingly, time slots 102 are advantageously assigned dynamically to various nodes on an as-needed basis.

One aspect of a MANET network 100 concerns a defined algorithm or method for assigning network capacity to individual nodes 102. This process will now be described with reference to FIGS. 3 and 4A-4D. According to one aspect of a solution disclosed herein, a network node 102 which needs to transport data can seek access to one or more time slots by using a predefined access control time slot (ACTS) 310. The ACTS 310 can be a specific time slot in each epoch that is advantageously reserved for network access control purposes as described herein. In some scenarios, the ACTS 310 can be in the same slot position in each epoch but the solution is not limited in this regard. In the example shown in FIG. 3, the ACTS 310 is always defined in the fourth slot from the beginning of each epoch. However, it should be understood that the solution is not limited in this regard and the ACTS 310 can also be defined in other slot positions.

In first epoch 301 of the series shown in FIG. 3, the ACTS 310 is to be used by one or more nodes of the network for purposes of requesting access to one or more time slots. Any node making such a request will be referred to herein as a source node. In the example shown in FIG. 4A the source node is understood to be node A for purposes of describing certain aspects of a solution presented herein. In epoch 301, the source node A uses the ACTS 310 to transmit an access request to nearby neighbor nodes B and Y. In some scenarios, the access request can advantageously specify one or more traffic time slots 104 that the source node seeks to use to communicate its data. After transmitting this request for access, node A waits for one or more responses from its neighboring nodes to be provided during subsequent epochs as hereinafter described.

In one or more subsequent epochs, the neighboring nodes 102 can use the same ACTS 310 to respond to the source node. For example, a scenario shown in FIG. 4A, a neighbor node B or Y can respond using ACTS 310 of a second epoch 302 which follows epoch 301, and/or a third epoch 303 which follows epoch 302. In some scenarios, second epoch 302 can immediately follow epoch 301 and epoch 303 can immediately follow epoch 302. Use of epochs which directly follow an epoch containing an access request can be advantageous to ensure that a source node is provided with timely responses to access requests as described herein. However, it should be understood that in some scenarios, a second epoch 302 and/or a third epoch 303 that may be used for responding to an access request, may not immediately follow a first epoch 301 in which the request is initiated.

When a neighboring node 102 (e.g., node B or Y in FIG. 4A) receives a request for network access from a source node, it will check an internal database or table maintained for this purpose. The internal table will indicate if the one or more time slots requested by the source node (node A in this example) are available for use. If a neighbor node (e.g., node B or Y) determines by checking its internal table that the requested time slots are not available, it will respond with a negative acknowledgment (Nack) indicating that it does not approve the network access that has been requested by the source node. If the neighbor node determines that the requested time slots are available for use by the requesting source node, then it can respond to the source node with a positive acknowledgement (Ack) indicating that it does approve the requested network access.

Figure 4A:
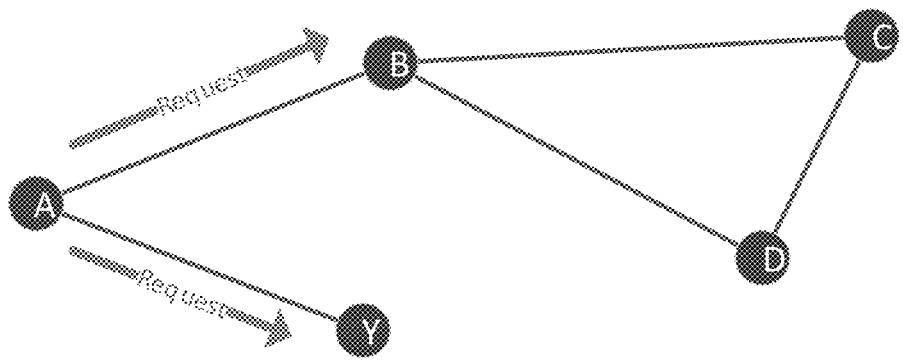
FIGS. 4A-4D are a series of drawings that are useful for understanding the how a network node in a MANET can request access to certain network resources.
Figure 4B:
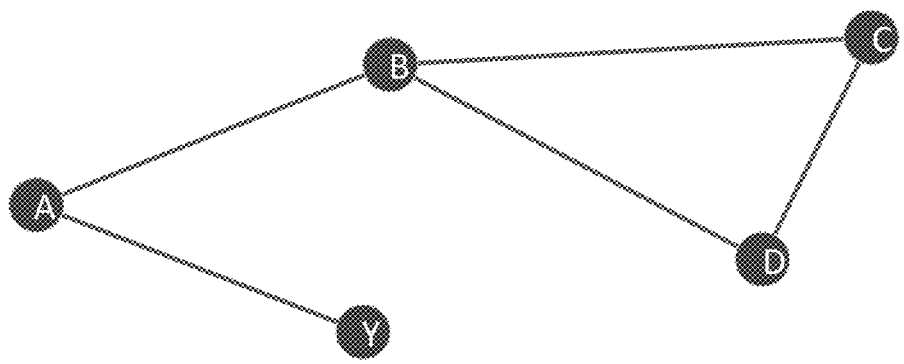

According to one aspect of a solution disclosed herein, second epoch 302 can be reserved for Nack responses from neighbor nodes indicating that the particular time slots requested by a source node are unavailable. In such scenarios, if a particular neighbor node determines that the requested time slots are unavailable, then it will signify this unavailability by transmitting a negative or Nack response in ACTS 310 of epoch 302. But if a neighbor node determines that the requested time slots are available for use, then no response will be transmitted by such neighbor node in epoch 302. This scenario, in which the requested time slots are determined by node B and Y to be available, is illustrated in FIG. 4B. Here, neighbor node B and node Y offer no response to the request from Node A during epoch 2.

Figure 4C:
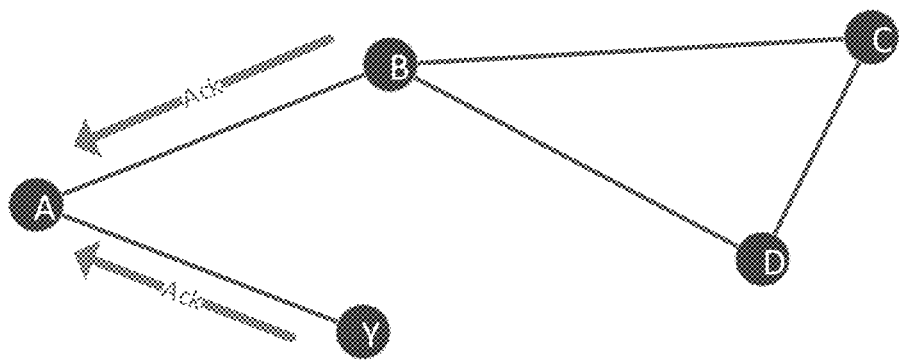

According to a further aspect, a third epoch 303 can be reserved for responses from neighbor nodes indicating that the particular time slots requested by a source node are available. If a particular neighbor node determines that the requested time slots are available, then it will signify this availability by transmitting an Ack response in ACTS 310 of epoch 303. This scenario (in which the requested time slots are available) is illustrated in FIG. 4C. Conversely, if the requested time slots are not available, then the neighbor nodes (nodes B and Y in this example) will not transmit in during ACTS 310 of epoch 303.

In scenarios in which neighbor nodes are transmitting an Ack or Nack response, all neighbor nodes construct exactly the same Ack or Nack message. Consequently, the RF energy from these separate messages will combine at the input of a receiving node (source node A in this example) such that they appear to the receiving node as multipath signals from the same source. This technique or method of communication is sometimes referred to herein as "avalanche." The avalanche technique is advantageous in this scenario as it enables the source node to very rapidly receive a response to a network access request in a short amount of time from many neighbor nodes. Thus, network latency can be minimized.

The solution as shown and described in FIG. 3 illustrates a scenario in which an Ack or Nack response from neighbor nodes is received during subsequent epochs. However, it should be understood that the solution is not limited in this regard. Thus, use of the same TDMA slot across epochs for the request, Ack and Nack as shown in FIG. 3 merely represents one particular embodiment. In other scenarios, the access request, the Ack response and the Nack response can be communicated in three TDMA slots within the same epoch. In other scenarios, the access request can be in a first epoch, and the Ack and Nack response can be communicated in a second epoch different from the first epoch. Thus, it will be understood that the exact placement of the slots reserved for access request, Ack response, and Nack response is not critical. Such slots can be assigned within the same epoch or across epochs and can be vary according to the requirements of a particular embodiment.

Further, it may be noted that since node A only needed confirmation of its network access request from nodes B and Y, there is a risk that another node in the network could coincidentally initiate a request to reserve the same slot at the same time. To reduce this probability of such a conflict occurring, slot selection requests initiated at each source node can be randomized. Each source node seeking access to the network will randomly select the particular time slots it seeks to use for its network traffic data transmissions. Consequently, chances are reduced that two different nodes will initiate access requests for the same slots at the same time.

According to one aspect of a solution described herein, a control plane can be used to advertise slot usage by all of the nodes comprising the network. This control plane can be implemented in one or more time slots that are specifically reserved for this purpose. For example, information comprising slot usage by various nodes of the network can be shared among all network nodes during each epoch. In some scenarios, this information can be shared using a portion of the Sync time slot or the Tier1 Bcn time slot. Time slot usage information can then be stored at each node in a time slot usage database or table. Accordingly, when a node randomly selects one or more time slots it is requesting for purposes of network access, it will consult its stored information concerning time slot usage, and will exclude those time slots which are determined to be already in use by other nodes of the network. Further, in those rare instances when two or more different source nodes randomly request use of the same time slots at the same time, the control plane can be used to detect and resolve such conflicts.

The solution described allows for some chance of collisions but offers several benefits. These benefits include low latency channel access, data access by any node in the network without limiting the number of nodes in the network, the absence of any need for a central command node, and minimal overhead to detect and resolve collisions.

Figure 4D:
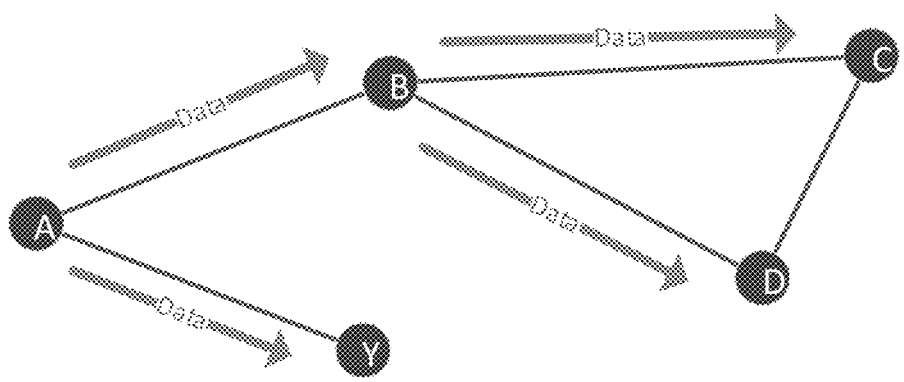

Once a source node (node A in this example) has been informed by its neighbor nodes that requested time slots are available for use, it can begin to transmit its data. Data transmissions to neighbor nodes can then proceed during the permitted time slots and can continue until the source node has completed sending its data. This condition is illustrated in FIG. 4D.

In a MANET, data is propagated across the network by being communicated from node to node. Transmission of data from a first node to an adjacent node is sometimes referred to herein as a hop. According to one aspect of a solution described herein, a network access request from a source node for reserving one or more time slots can include relay capacity for an unlimited number of hops. In particular, unique time slots can be requested by a source node for a first, second and third hop. For the fourth and subsequent hops, the same three time slots can be reused. This approach, which is described below in further detail, ensures that a request for channel access does not need to be repeated for every relay hop. Instead, relay nodes only need to be told how far (how many hops) across the network the data is to be propagated.

Figure 5:
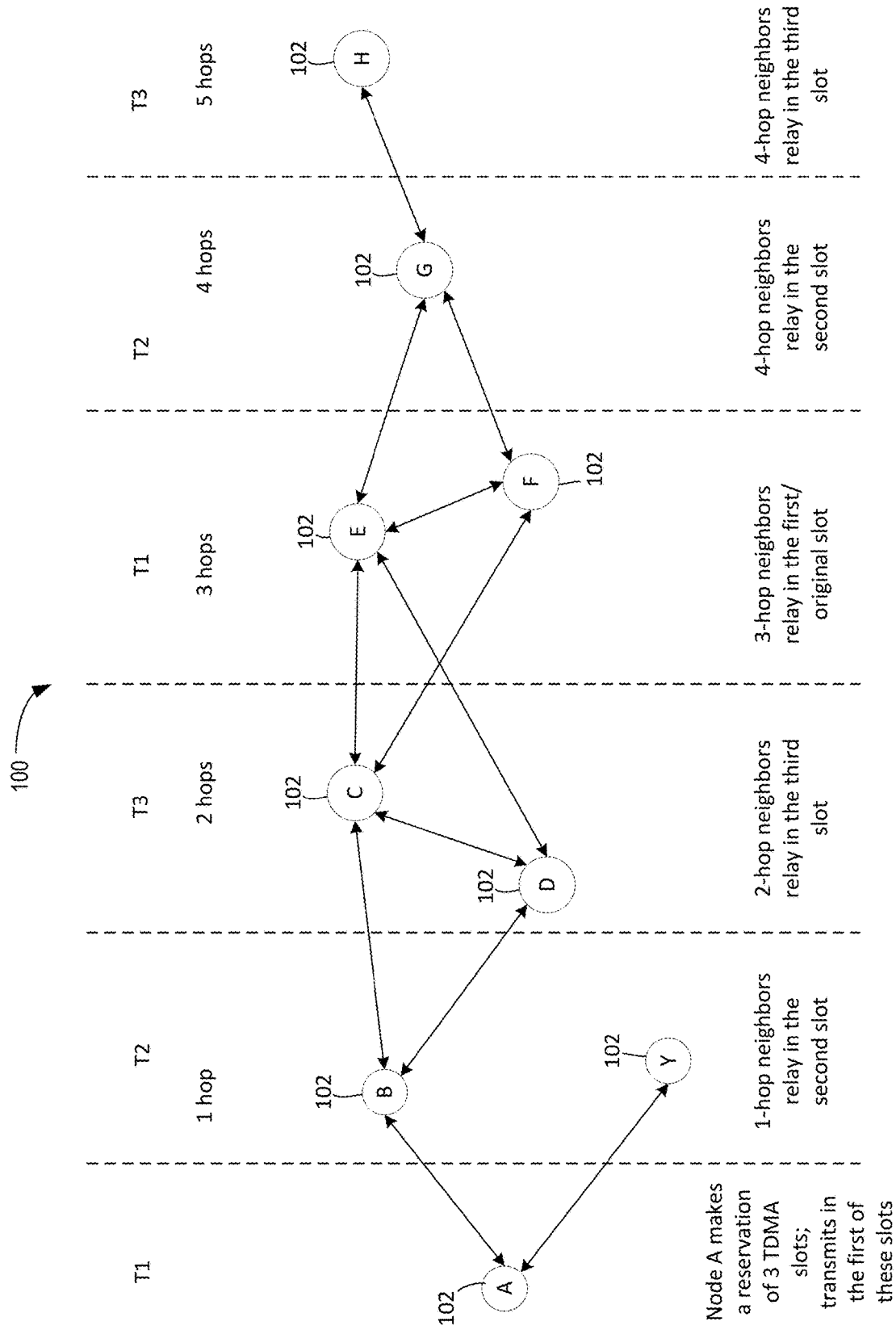
FIG. 5 is a drawing that is useful for understanding how data is relayed in a MANET network.

The foregoing concept is illustrated in FIG. 5 which shows network 100 in which Node A is again assumed to be a source node that seeks to transmit data. Node A requests network access from its neighbor nodes as described above. In particular, Node A seeks and obtains a reservation of 3 TDMA time slots. For convenience, these three time slots will be referred to herein as T1, T2, and T3. Once reservation of these time slots has been confirmed or acknowledged by its neighbor nodes B and Y, node A can begin transmitting its data. In some scenarios, a source node of transmitted data can advantageously indicate "in-band" how many hops the data should be transmitted across the network. For example, such in-band data can be included as part of each packet of data traffic that is transmitted from a source node.

Given the foregoing, source node A in FIG. 5 begins by transmitting data P in T1. Thereafter, the 1-hop neighbor B will relay message P during T2 to nodes C and D. Note that in this example, Node Y is not in communication with any nodes other than Node A. Node Y can retransmit the data it received from Node A, but in this particular scenario such re-transmission is not required since Y does not have any one-hop neighbors to relay the data to. So, it might be said that Node Y is not performing a relay function from the perspective of the network. But from Node Y's perspective such node is performing a relay function, albeit to no effect.

During T3, the 2-hop neighbors C and D will relay message P to Nodes E and F. At this point, the propagation of message P has now transitioned three hops such that re-use of the reserved time slots T1, T2 and T3 can begin. The 3-hop neighbors E and F will relay message P to node G in the first re-use of T1. The 4-hop neighbor G will relay message P to Node H in the first re-use of T2. The 5-hop neighbor H will relay message P to its neighbors (not shown) in the first re-use of T3. Thereafter, re-use of T1, T2, and T3 can continue until message P has propagated a predetermined number of hops across the network.

It may be noted that in the foregoing description involving relay of data, two or more nodes may be transmitting the same data concurrently. For example, in the discussion above, during T3 the two hop neighbors C and D will concurrently transmit during the same time slot to relay message P to the nodes E and F. At the receiving end of such relay communication, nodes E and F will treat the two nearly simultaneous messages transmitted by C and D as multipath communication of the same message. This improves the chances of reception by nodes E and F, but also has the beneficial effect of improving bandwidth utilization since both messages are broadcast at the same time. This technique of concurrent transmission of the same data by different nodes is sometimes referred to as an avalanche transmission method.

Figure 6A:
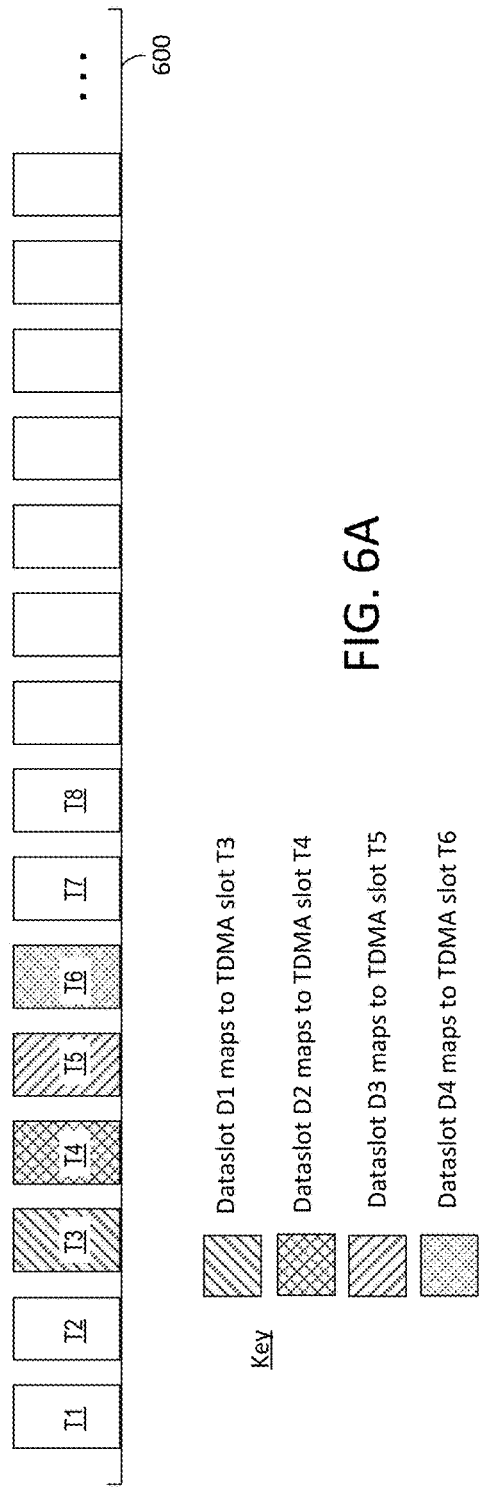
FIGS. 6A and 6B are series of drawings that are useful for understanding how data is transmitted and relayed in a first scenario in a MANET network.
Figure 6B:
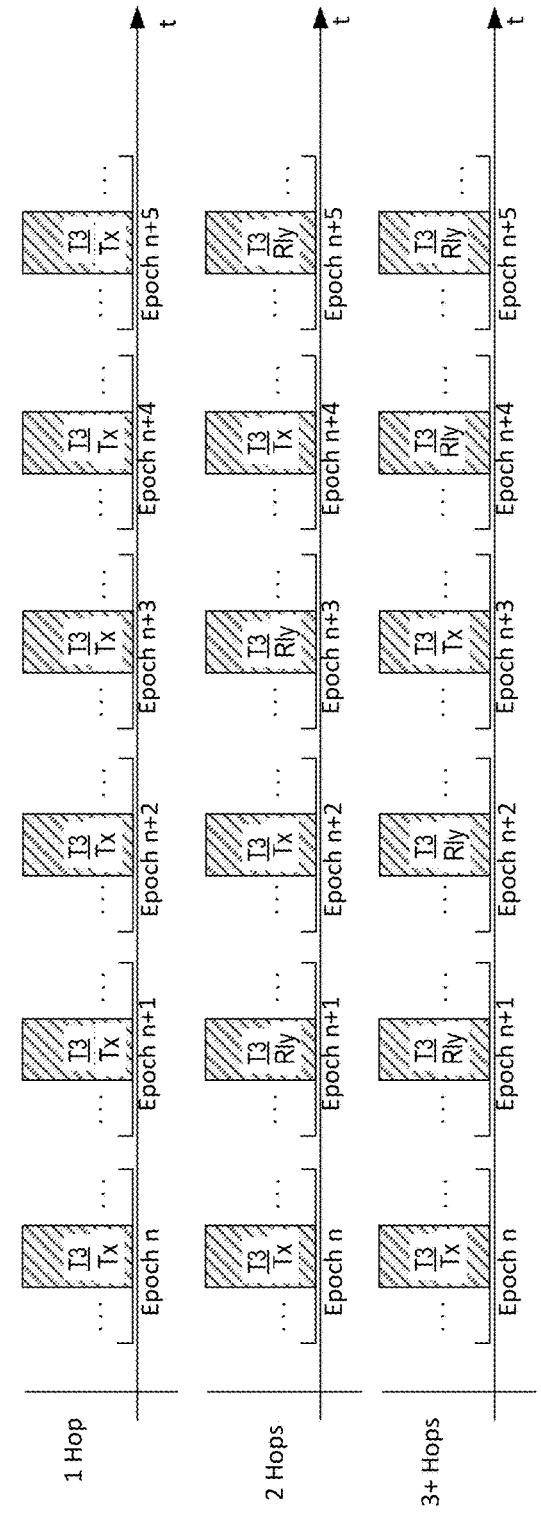
Figure 7A:
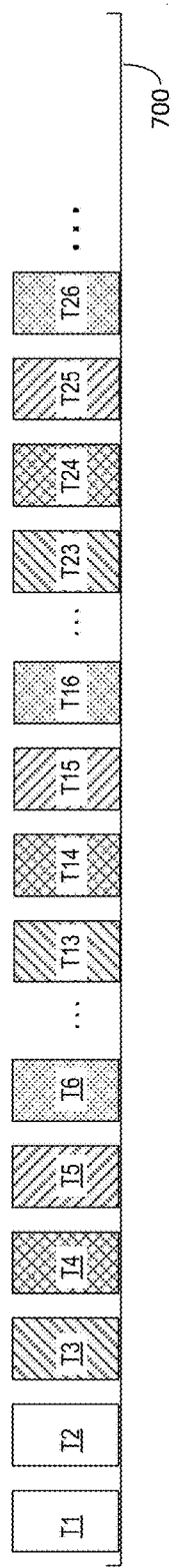
FIGS. 7A and 7B are series of drawings that are useful for understanding how data is transmitted and relayed in a second scenario in a MANET network.
Figure 7B:
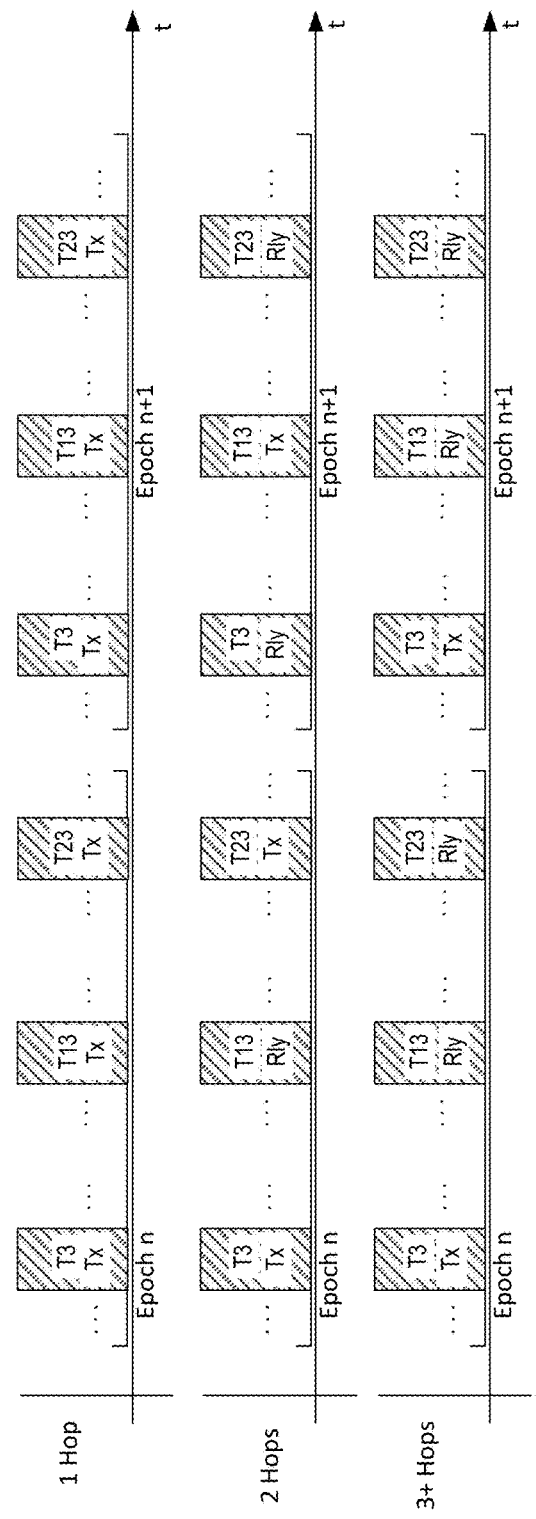
Figure 8A:
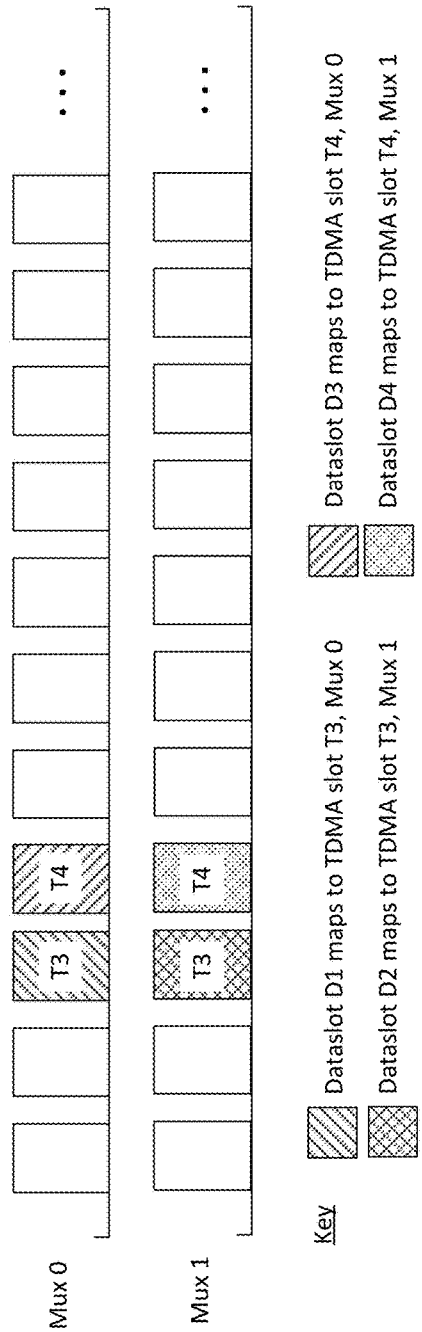
FIGS. 8A and 8B are series of drawings that are useful for understanding how data is transmitted and relayed in a third scenario in a MANET network.
Figure 8B:
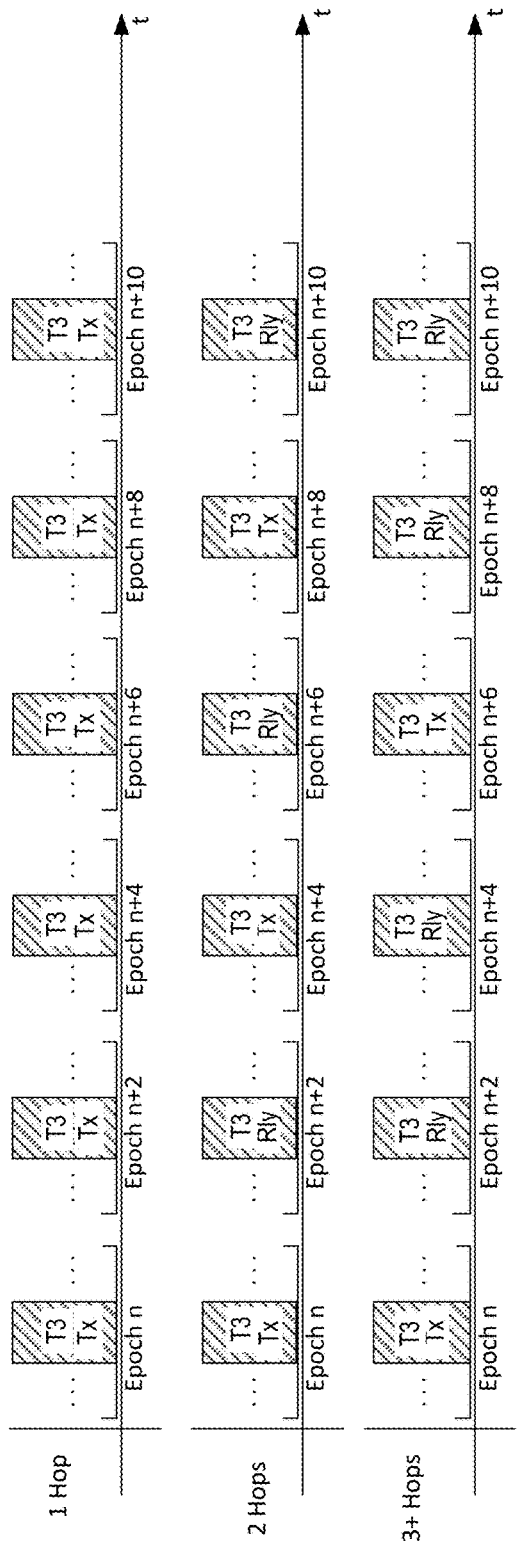

MANET networks used for various applications can have very different profiles. For example, some networks may need to support only a small number of nodes whereas other networks may need to support a large number of nodes. Similarly, some networks can require normal latency performance whereas other network scenarios can require low latency. To accommodate these widely varying network profiles and performance criteria the concept of "dataslots" is introduced. A dataslot represent a convenient abstraction of a portion of a network communications capacity insofar as it facilitates different mappings of network capacity to actual TDMA slots. In some scenarios, a single dataslot can map to a single TDMA time slot. Such an arrangement is illustrated in FIGS. 6A and 6B. However, the solution is not limited in this regard and in other scenarios, a single dataslot can map to a plurality of TDMA slots. This type of configuration is illustrated in FIGS. 7A and 7B. In other scenarios, more dataslots can be created by multiplexing TDMA slots. Such a scenarios is shown in FIGS. 8A and 8B. Each of these scenarios are described below in greater detail. More broadly, it should be noted that in a solution disclosed herein, dataslots can be mapped to TDMA slots at waveform start such that if a node has knowledge of when it received data, it automatically knows when to relay it.

According to one aspect of a network solution described herein, the number of hops that data is transmitted across the network can indirectly affect the channel capacity or throughput. For example, in a scenario in which a source node only needs to transmit data one hop, there will be no need for a relay. Accordingly, channel capacity of a dataslot will be 100%. In a similar scenario where the data needs to be transmitted two hops, the first hop neighbor will relay in the next available dataslot transmit opportunity, and the second hop neighbor does not relay. Accordingly, dataslot channel capacity will be 50%. If a data transmission requires three hops, then the node at every hop will perform a relay in the next available dataslot transmit opportunity and channel capacity will only be 33%. The concept of dataslots and channel network capacity are discussed in further detail below with respect to FIGS. 6-8.

The concept of dataslots and TDMA time slot mappings will now be described in greater detail. Shown in FIGS. 6A and 6B is a first scenario in which a single dataslot can map to a single TDMA time slot. In FIG. 6A there is shown an epoch 600 of a TDMA waveform. The epoch 600 includes a multiplicity of TDMA time slots including T1-T8. Each dataslot D1, D2, D3, D4 of network communication capacity will map to exactly one of the TDMA time slots. This mapping is understood with reference to the key in FIG. 6A, which shows that a pattern fill of each TDMA time slot is used to identify a mapping of a particular dataslot D1, D2, D3, D4. In particular, dataslot D1 maps to TDMA time slot T3, dataslot D2 maps to TDMA time slot T4, dataslot D3 maps to TDMA time slot T5, and dataslot D4 maps to TDMA time slot T6.

Given the mapping in FIG. 6A, we next compare in FIG. 6B three different hop scenarios involving a single dataslot. For purposes of discussion the focus will be on dataslot D1, but it should be understood that a similar behavior is exhibited by each of the other dataslots D2, D3 and D4. Included in FIG. 6B, is a first scenario where data only needs to be transmitted one hop, a second scenario in which data needs to be transmitted two hops, and a third scenario in which data needs to be transmitted three or more hops. For convenience, the following description will refer to the example network in FIG. 5, it being understood that the solution is not limited in this regard.

In the 1 hop scenario data is transmitted 1 hop (e.g., from a source node A to a neighbor node B) during each epoch upon occurrence of TDMA slot T3. This is the simplest scenario since data is only being communicated 1 hop and consequently no relay is required. A first data packet is transmitted at Epoch n, in TDMA slot T3, a second data packet is transmitted at Epoch n+1, in TDMA slot T3, and a third data packet is transmitted at Epoch n+2 in TDMA slot T3. The process continues in a similar manner for each subsequent Epoch until all necessary data has been transmitted from the source node.

In the 2 hop scenario, a first data packet is transmitted 1 hop during a first epoch (Epoch n) upon occurrence of TDMA slot T3. In the example network of FIG. 5, this can be a transmission from source node A to neighboring node B and Y. In the next epoch (Epoch n+1), the first data packet is relayed by the neighbor node to its one hop neighbors. For example, in the example network of FIG. 5, the first data packet would be relayed in Epoch n+1 from node B to nodes C and D upon occurrence of TDMA slot T3. In the next epoch (Epoch n+2) the process repeats with a second data packet. The second data packet is transmitted by the source node upon occurrence of TDMA slot T3. For example, in the network of FIG. 5, the data would be transmitted 1 hop from source node A to node B and node Y. The process of transmission by the source node followed by a relay operation during a subsequent epoch repeats in this way until source node A has completed transmission of its data and all data has been relayed.

The final scenario shown in FIG. 6B is one involving three or more (3+) hops. In this scenario, a first data packet is transmitted 1 hop during a first epoch (Epoch n) upon occurrence of TDMA slot T3. For example, in the example network of FIG. 5, the 1 hop transmission could be from source node A to node B. In the next epoch (Epoch n+1), the first data packet is relayed by the neighbor node which received the original transmission from the source node. So, for example, in the illustrative network shown in FIG. 5, the first data packet could be relayed from node B to nodes C and D. This relay operation would be performed upon occurrence of TDMA slot T3 in Epoch n+1. In the next epoch (Epoch n+2) the first data packet again must be relayed during T3. For example, the relay operation can involve a relay of the first data packet from nodes C and D to nodes E and F. Note that at this point, the original or first data packet from the source node has now been relayed 3 hops. If the data was only specified to transit three hops, then no further relay is needed. If further relay hops are specified, such hops are permitted and further relay of the first data packet by other nodes comprising the network may occur in each subsequent epoch at the occurrence of TDMA slot T3. These relay operations are not explicitly shown in FIG. 6B (although they may be present if more than three hops are specified). Instead, the time line shown in FIG. 6B shows that the source node will repeat the transmission process. In the present example, this would be a second transmission by node A involving transmitting of a second data packet to its neighbor nodes B and Y. In particular, source node A will transmit the second data packet, in this instance by utilizing time slot T3 in Epoch n+3. Subsequent relay operations in Epoch n+4 and Epoch n+5 will be performed in a manner similar to that described above with respect to Epochs n+1 and n+2. The process of transmission by the source node followed by relay operations during subsequent epochs repeats in this way until source node A has completed transmission of its data and all data has been relayed.

Note that in the above example, network time slot re-use rules allow source node A to again transmit during T3 after the first data packet has transited three hops. This is permitted because it is assumed that after 3 hops, that any relay transmissions are sufficiently geographically distant from source node A such that the associated relay signals will be substantially attenuated relative to the source node.

Shown in FIGS. 7A and 7B is a second scenario in which a single dataslot can map to multiple TDMA time slots. In FIG. 7A there is shown an epoch 700 of a TDMA waveform. The epoch 700 includes a multiplicity of TDMA time slots including T1-T6, T13-T16, and T23-T26. In this example, each dataslot D1, D2, D3, D4 of network communication capacity will map to multiple TDMA time slots. This mapping is understood with reference to the key in FIG. 7A, which shows that a pattern fill of each time slot is used to identify a mapping of a particular dataslot D1, D2, D3, D4. In particular, it can be observed in this example that dataslot D1 maps to TDMA time slots T3, T13, T23; dataslot D2 maps to TDMA time slots T4, T14, T24; dataslot D3 maps to TDMA time slots T5, T15, T25 and dataslot D4 maps to TDMA time slots T6, T16, and T26.

Given the mapping in FIG. 7A, we next compare in FIG. 7B three different hop scenarios involving a single one of the dataslots D1. These include a first scenario where data only needs to be transmitted one hop, a second scenario in which data needs to be transmitted two hops, and a third scenario in which data needs to be transmitted three or more hops. For convenience, the description will again refer to the example network in FIG. 5, it being understood that the solution is not limited in this regard. The transmission and relay characteristics are only illustrated for dataslot D1, but it should be understood that the other dataslots D2, D3, D4 would exhibit a similar behavior.

In the 1 hop scenario shown in FIG. 7B, data is transmitted 1 hop (e.g., from a source node A to a neighbor node B) three times during each epoch. In this example dataslot 1 is mapped to TDMA slots T3, T13, and T23. Accordingly, a first data packet is transmitted by the source node upon occurrence of TDMA slot T3, a second data packet can be transmitted upon occurrence of TDMA slot T13 and a third data packet can be transmitted upon occurrence of TDMA slot T23. The process continues in this way until all data has been sent. This is the simplest scenario as no relay step is needed since data is only being communicated 1 hop.

In the 2 hop scenario, a first data packet is transmitted (e.g., by source node A) 1 hop upon occurrence of T3 during a first epoch (Epoch n). The first data packet is then relayed at T13 in the same epoch. For example, node B can relay the data to nodes C and D. Thereafter, at T23 of the same epoch (Epoch n), the source node (e.g., node A) transmits a second data packet to node B. In the next epoch (Epoch n+1), upon occurrence of time slot T3, the second data packet is relayed. For example, node B can relay the second data packet to nodes C and D. Later in Epoch n+1, a third data packet is transmitted by the source node (e.g., node A to node B) upon occurrence of slot T13. A relay operation can then occur in Epoch n+1 at T23 (e.g., from node B to nodes C and D). In particular, node B can relay the third data packet. From the foregoing it may be understood that data packets are alternately transmitted from a source node and relayed during each TDMA time slot that has been mapped to the particular dataslot. The process repeats in this way until source node A has completed transmission of its data and all data has been relayed.

The final scenario shown in FIG. 7B is one involving three or more (3+) hops. In this scenario a first data packet is transmitted from a source node during a first epoch (Epoch n) upon occurrence of a first time slot T3 mapped to dataslot D1. For example, the first data packet may be transmitted from node A to nodes B and Y. Within the same epoch upon occurrence of a second time slot T13 which is also mapped to D1, the first data packet is relayed. For example, the first data packet can be relayed from node B to nodes C and D. Within the same epoch upon occurrence of a third time slot T23, the first data packet can be relayed from nodes C and D to nodes E and F. The first data packet has now been relayed 3 hops.

If the data was only specified to transit three hops, then no further relay is needed. If further relay hops are specified, such hops are permitted and relay may occur in each subsequent epoch. These additional relay operations are not explicitly shown in FIG. 7B (although they may be present if more than three hops are specified). Instead, FIG. 7B shows that at T3 of Epoch n+1, the source node will repeat the above process. For example, in the example network shown in FIG. 5, source node A can once transmit in T3 a second data packet to its neighbor nodes B and Y. At T13 and T23 of Epoch N+1, this second data packet will be relayed as described above.

Note that re-use of T3, T13 and T23 is permitted after three hops. It is assumed that any further relay operations will be performed by nodes that are sufficiently geographically distant from source node such that the associated relay signals will be substantially attenuated. The process of transmission by the source node followed by relay operations during time slots associated with dataslot D1 repeats in this way until the source node has completed transmission of its data and all data has been relayed.

Shown in FIGS. 8A and 8B is a scenario in which a single dataslot can map to a particular TDMA time slot, but only within certain epochs. This technique allows the TDMA waveform to be effectively multiplexed to facilitate certain types of network load scenarios. For example, this solution is particularly effective for configurations requiring many data senders since it facilitates creation of more data slots by multiplexing the TDMA time slots.

With reference to FIG. 8A an example is illustrated in which a TDMA waveform is multiplexed into two defined channels, which are defined as Mux 0 and Mux 1. Since there are two multiplex channels (i.e., Mux 0 and Mux 1) they are active in alternating epochs. For example, in Epoch n Mux 0 may active while Mux 1 is inactive. In Epoch n+1, Mux 1 may be active while Mux 0 is inactive. In Epoch n+2, Mux 0 may again be active while Mux 1 is inactive. During Epoch n+3, Mux 1 may be active while Mux 0 is inactive. Although a scenario involving only two defined multiplex channels is discussed here, it should be understood that the solution is not limited in this regard. Additional multiplex channels can be defined in a similar manner. For example, if three multiplex channels were provided, each would be active only every third epoch.

Within the foregoing context, dataslots are defined in accordance with a specified TDMA slot and a particular multiplex channel. This mapping may be understood with reference to the key in FIG. 8A, in which a pattern fill of each time slot is used to identify a mapping of a particular dataslot D1, D2, D3, D4. It can be observed in this example that dataslot D1 maps to TDMA time slot T3, Mux 0; dataslot D2 maps to TDMA time slot T3, Mux 1; dataslot D3 maps to TDMA time slot T4, Mux 0; and dataslot D4 maps to TDMA time slot T4, Mux 1.

Given the mapping in FIG. 8A, we next compare in FIG. 8B three different hop scenarios involving a single one of the dataslots D1. These include a first scenario where data only needs to be transmitted one hop, a second scenario in which data needs to be transmitted two hops, and a third scenario in which data needs to be transmitted three or more hops. For convenience, the description will again refer to the example network in FIG. 5, it being understood that the solution is not limited in this regard. The transmission and relay characteristics are only illustrated for dataslot D1, but it should be understood that the other dataslots D2, D3, D4 would exhibit a similar behavior.

In the 1 hop scenario shown in FIG. 8B, data is transmitted 1 hop (e.g., from a source node A to a neighbor node B) one time during each alternate epoch corresponding to Mux 0. In this example dataslot 1 is mapped to TDMA slots T3, Mux 0. Accordingly, a first data packet is transmitted by the source node upon occurrence of TDMA slot T3, in Epoch n. Since Mux 0 is not active in Epoch n+1, no data is transmitted during that time. A second data packet is transmitted in Epoch n+2 upon occurrence of TDMA slot T3. Since Mux 0 is not active in Epoch n+3, no data is transmitted during that time. A third data packet is transmitted in Epoch n+4 upon occurrence of TDMA slot T3. The process continues in this way, with data being transmitted every other epoch, until all data has been sent. This is the simplest scenario as no relay step is needed since data is only being communicated 1 hop.

In the 2 hop scenario, a first data packet is transmitted (e.g., by source node A) 1 hop upon occurrence of T3 during a first epoch (Epoch n). Since Mux 0 is not active in Epoch n+1, no data is transmitted or relayed during that time. Subsequently, in Epoch n+2 the first data packet is relayed at T3. For example, node B can relay the data to nodes C and D. Since Mux 0 is not active in Epoch n+3, no data is transmitted or relayed during that time. Thereafter, in Epoch n+4, the source node (e.g., node A) transmits a second data packet to node B. Since Mux 0 is not active in Epoch n+5, no data is transmitted or relayed during that time. In the next epoch (Epoch n+6), upon occurrence of time slot T3, the second data packet is relayed. For example, node B can relay the second data packet to nodes C and D. Since Mux 0 is not active in Epoch n+7, no data is transmitted or relayed during this time. Later, in Epoch n+8, a third data packet is transmitted by the source node (e.g., node A to node B) upon occurrence of slot T3. Since Mux 0 is not active in Epoch n+9, no data is transmitted or relayed during such time. However, a relay operation can occur in Epoch n+10 at T3 (e.g., from node B to nodes C and D). In particular, node B can relay the third data packet. From the foregoing it may be understood that data packets are alternately transmitted from a source node and relayed during each TDMA time slot that has been mapped to the particular dataslot. The process repeats in this way until source node A has completed transmission of its data and all data has been relayed.

The final scenario shown in FIG. 8B is one involving three or more (3+) hops. In this scenario a first data packet, is transmitted from a source node during a first epoch (Epoch n) upon occurrence of a first time slot T3 mapped to dataslot D1. For example, the first data packet may be transmitted from node A to nodes B and Y. Since Mux 0 is not active in Epoch n+1, no data is transmitted or relayed during such time. Subsequently, in Epoch n+2, upon occurrence of a time slot T3, the first data packet is relayed. For example, the first data packet can be relayed from node B to nodes C and D. Since Mux 0 is not active in Epoch n+3, no data is transmitted or relayed during such time. However, in Epoch n+4, upon occurrence of a time slot T3, the first data packet can be relayed from nodes C and D to nodes E and F. The first data packet has now been relayed 3 hops.

If the data was only specified to transit three hops, then no further relay is needed. If further relay hops are specified, such hops are permitted and relay may occur in T3 in alternate subsequent epochs associated with Mux 0. These additional relay operations are not explicitly shown in FIG. 8B (although they may be present if more than three hops are specified). Instead, FIG. 8B shows that at T3 of Epoch n+6, the source node will repeat the above process. For example, in Epoch n+6, source node A can transmit in T3 a second data packet to its neighbor nodes B and Y. Upon occurrence of T3 in Epoch n+8 and Epoch n+10, this second data packet will be relayed as described above.

Note that re-use of dataslot D1 is permitted after three hops. It is assumed that any further relay operations will be performed by nodes that are sufficiently geographically distant from source node such that the associated relay signals will be substantially attenuated. The process of transmission by the source node followed by relay operations during time slots associated with dataslot D1 repeats in this way until the source node has completed transmission of its data and all data has been relayed.

Figure 9:
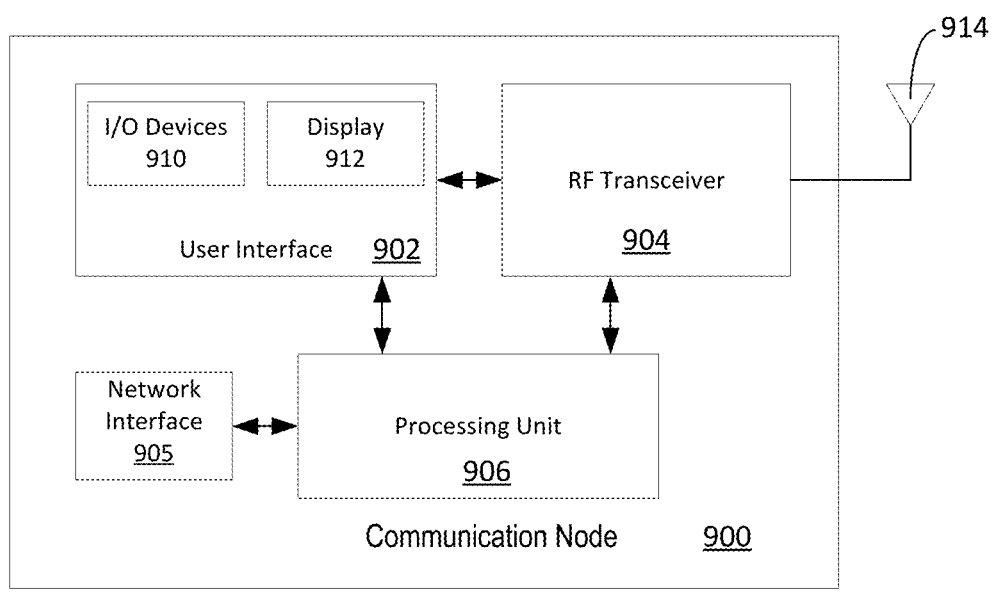
FIG. 9 is a block diagram which is useful for understanding a communication node of a MANET network.

Shown in FIG. 9 is an block diagram of a MANET communication node 900 which is useful for understanding certain aspects of a communication solution described herein. The communication node includes a user interface 902, an RF transceiver 904, a network interface 905, and a processing unit 906. The user interface 902 can include input/output devices such as a microphone, a loudspeaker, and a keypad. The user interface can also include a display unit 912. In some scenarios, a network interface device 905 can be provided to allow the node to receive and transmit data from one or more computing machines comprising a computer network (not shown). Data and voice communications are transmitted and received wirelessly at node 900 using RF transceiver 904. The transceiver 904 can be configured to communicate through antenna 914 using a TDMA waveform. Control over such data communications are facilitated by the processing unit 906. In some scenarios, the processing unit can be configured to cause the node 900 to implement one or more communications in accordance with the methods and techniques described herein.

The processor unit 906 can comprise one or more components such as a processor, an application specific circuit, a programmable logic device, a digital signal processor, or other circuit programmed to perform the functions described herein. Embodiments can be realized in one computer system or several interconnected computer systems. Any kind of computer system or other apparatus adapted for carrying out the methods described herein is suited. The computer system can have a computer program that can control the computer system such that it carries out the methods described herein.

Communication node 900 should be understood to be one possible example of a communication node which can be used in connection with the various embodiments. However, the embodiments are not limited in this regard and any other suitable node architecture can also be used without limitation.

Figure 10:
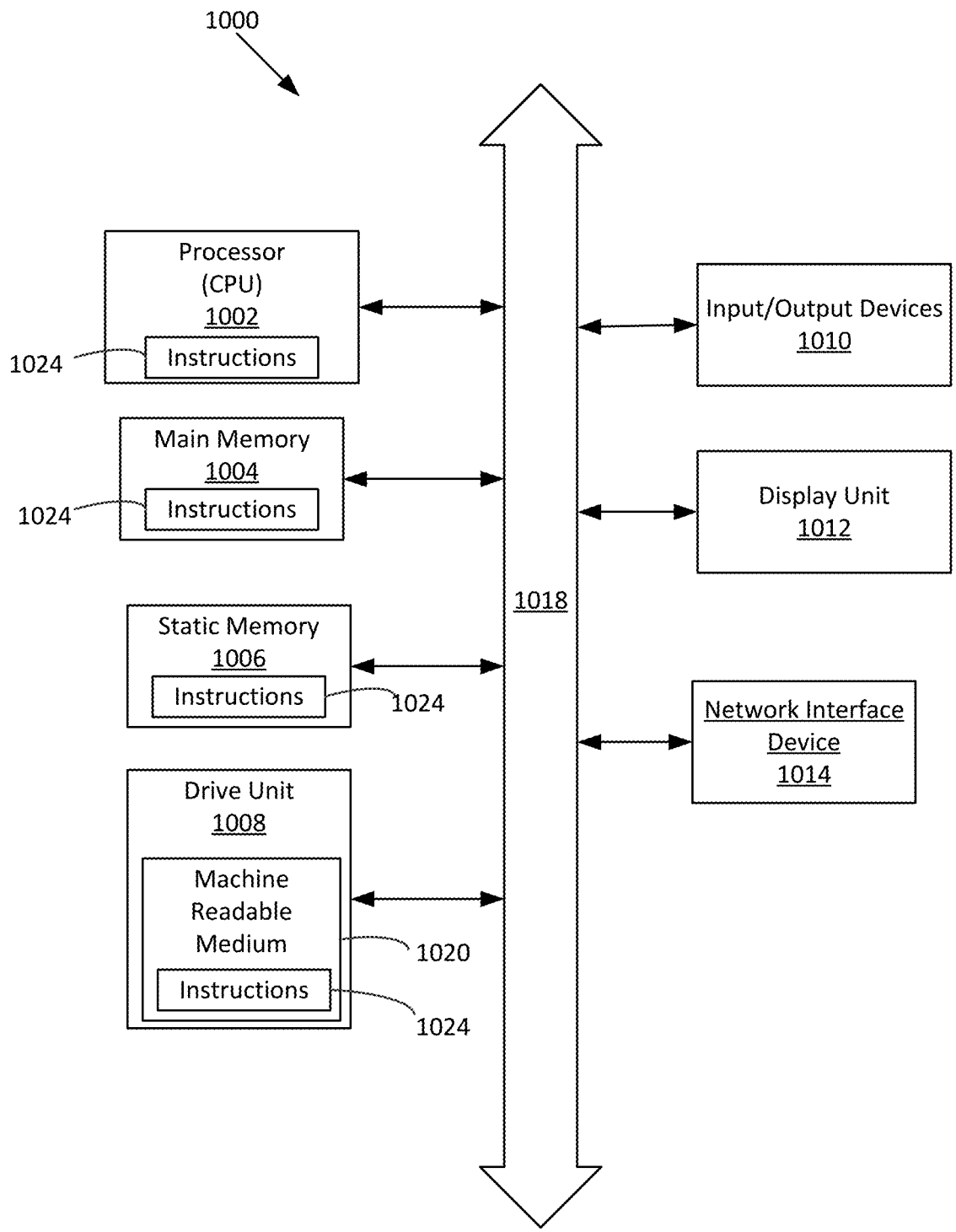
FIG. 10 is a block diagram which is useful for understanding a processing unit of a communication node that can perform certain operations as described herein for purposes of implementing a MANET network.

Referring now to FIG. 10, there is shown a hardware block diagram comprising an exemplary computer system 1000. The machine can include a set of instructions which are used to cause the computer system to perform any one or more of the methodologies discussed herein. In one or more embodiments, the exemplary computer system 1000 can correspond to processing unit 906. While only a single machine is illustrated it should be understood that embodiments can be taken to involve any collection of machines that individually or jointly execute one or more sets of instructions as described herein.

The computer system 1000 is comprised of a processor 1002 (e.g. a central processing unit or CPU), a main memory 1004, a static memory 1006, a drive unit 1008 for mass data storage and comprised of machine readable media 1020, input/output devices 1010, a display unit 1012 (e.g. a liquid crystal display (LCD) or a solid state display), and a network interface device 1014. Communications among these various components can be facilitated by means of a data bus 1018. One or more sets of instructions 1024 can be stored completely or partially in one or more of the main memory 1004, static memory 1006, and drive unit 1008. The instructions can also reside within the processor 1002 during execution thereof by the computer system. The input/output devices 1010 can include a keyboard, a mouse, a multi-touch surface (e.g. a touchscreen) and so on. The network interface device 1014 can be comprised of hardware components and software or firmware to facilitate network data communications in accordance with a network communication protocol.

The drive unit 1008 can comprise a machine readable medium 1020 on which is stored one or more sets of instructions 1024 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 1000 should be understood to be one possible example of a computer system which can be used in connection with the various embodiments. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A method for on-demand allocation of communication capacity in a Mobile ad hoc Network (MANET) utilizing a Time Division Multiple Access (TDMA) waveform, comprising:
in a first node of a plurality of nodes comprising the MANET, initiating a request for network communication capacity by wirelessly transmitting in a first epoch, during a predetermined access request time slot of the TDMA waveform, an access request directed to one or more one-hop neighbor nodes with which the first node can communicate directly;
determining whether the access request has been granted based on at least one response received from one or more of the one-hop neighbor nodes indicating a determination by each of the one-hop neighbor nodes regarding their availability to accommodate the access request; and
using the network communication capacity by the first node to communicate data if the access request has been granted;
wherein the at least one response is received from the one or more one-hop neighbor nodes in a second and third TDMA slot subsequent to the access request time slot;
wherein the first node reserves the second TDMA slot as a denial time slot for concurrently receiving any denial of the access request from the one or more neighbor nodes; and
wherein the denial time slot is the same time slot as the access request time slot but residing in a second epoch subsequent to the first epoch.

2. The method of claim 1, wherein first node determines one or more units of potentially available network capacity before initiating the access request by consulting network usage data stored at the first node.

3. The method of claim 1, wherein the access request includes a reservation of network communication capacity for both the first node to facilitate transmission of data to the one or more one-hop neighbor nodes, and for a data relay operation to be performed by the one or more one-hop neighbor nodes.

4. The method of claim 3, wherein the reservation of network communication capacity for the data relay operation is for two or more neighbor nodes to concurrently transmit in accordance with an avalanche mode of transmission.

5. The method of claim 1, wherein the access request is for a multiple of three time slots and is sufficient to provide unlimited hop forwarding in the MANET.

6. The method of claim 1, wherein the access request is for one or more dataslots of network capacity.

7. The method of claim 6, wherein each of the one or more dataslots is mapped to a TDMA time slot.

8. The method of claim 7, wherein each dataslot maps to exactly one TDMA time slot.

9. The method of claim 7, wherein each dataslot maps to a plurality of time slots.

10. The method of claim 7, wherein the TDMA waveform is time-domain multiplexed into a plurality of multiplex channels, and each dataslot is mapped to only one of the plurality of multiplex channels.

11. A method for on-demand allocation of communication capacity in a Mobile ad hoc Network (MANET) utilizing a Time Division Multiple Access (TDMA) waveform, comprising:
in a first node of a plurality of nodes comprising the MANET, initiating a request for network communication capacity by wirelessly transmitting in a first epoch, during a predetermined access request time slot of the TDMA waveform, an access request directed to one or more one-hop neighbor nodes with which the first node can communicate directly;
determining whether the access request has been granted based on at least one response received from one or more of the one-hop neighbor nodes indicating a determination by each of the one-hop neighbor nodes regarding their availability to accommodate the access request; and
using the network communication capacity by the first node to communicate data if the access request has been granted;
wherein the at least one response is received from the one or more one-hop neighbor nodes in a second and third TDMA slot subsequent to the access request time slot;
wherein the first node reserves the third TDMA slot as a grant time slot for receiving any grant of the access request concurrently from the one or more neighbor nodes; and
wherein the grant time slot is the same time slot as the access request time slot but residing in a third epoch subsequent to the first epoch.

12. A network node for on-demand allocation of communication capacity in a Mobile ad hoc Network (MANET) utilizing a Time Division Multiple Access (TDMA) waveform, comprising:
a transceiver configured to facilitate wireless communications with a plurality of nodes forming the MANET;
a processing unit configured to
initiate a request for network communication capacity by causing the transceiver to wirelessly transmit in a first epoch, during a predetermined access request time slot of the TDMA waveform, an access request directed to one or more one-hop neighbor nodes with which the network node can communicate directly;
determine whether the access request has been granted based on at least one response received by said transceiver from one or more of the one-hop neighbor nodes, where said response indicates a determination by each of the one-hop neighbor nodes regarding their availability to accommodate the access request;
use the network communication capacity and the transceiver to communicate data traffic if the access request has been granted;
wherein the processing unit is configured to receive the at least one response from the one or more one-hop neighbor nodes in a second and third TDMA slot subsequent to the access request time slot;
wherein the processing unit reserves the second TDMA slot as a denial time slot for concurrently receiving any denial of the access request from the one or more neighbor nodes; and
wherein the denial time slot is the same time slot as the access request time slot but residing in a second epoch subsequent to the first epoch.

13. The network node of claim 12, wherein processing unit determines one or more units of potentially available network capacity before initiating the access request by consulting network usage data recorded in a data store of the network node.

14. The network node of claim 12, wherein the access request includes a reservation of network communication capacity for the network node to facilitate transmission of data to the one or more one-hop neighbor nodes, and for a data relay operation to be performed by the one or more one-hop neighbor nodes.

15. The network node of claim 14, wherein the reservation of network communication capacity for the data relay operation is for two or more neighbor nodes to concurrently transmit in accordance with an avalanche mode of transmission.

16. The network node of claim 12, wherein the access request is for a multiple of three time slots and is sufficient to provide unlimited hop forwarding in the MANET.

17. The network node of claim 12, wherein the access request is for one or more dataslots of network capacity.

18. The network node of claim 17, wherein each of the one or more dataslots is mapped to a TDMA time slot.

19. The network node of claim 18, wherein each dataslot maps to exactly one TDMA time slot.

20. The network node of claim 18, wherein each dataslot maps to a plurality of time slots.

21. The network node of claim 18, wherein the TDMA waveform is time-domain multiplexed into a plurality of multiplex channels, and each dataslot is mapped to only one of the plurality of multiplex channels.

22. A network node for on-demand allocation of communication capacity in a Mobile ad hoc Network (MANET) utilizing a Time Division Multiple Access (TDMA) waveform, comprising:
   a transceiver configured to facilitate wireless communications with a plurality of nodes forming the MANET;
   a processing unit configured to
   initiate a request for network communication capacity by causing the transceiver to wirelessly transmit in a first epoch, during a predetermined access request time slot of the TDMA waveform, an access request directed to one or more one-hop neighbor nodes with which the network node can communicate directly;
   determine whether the access request has been granted based on at least one response received by said transceiver from one or more of the one-hop neighbor nodes, where said response indicates a determination by each of the one-hop neighbor nodes regarding their availability to accommodate the access request;
   use the network communication capacity and the transceiver to communicate data traffic if the access request has been granted;
   wherein the processing unit is configured to receive the at least one response from the one or more one-hop neighbor nodes in a second and third TDMA slot subsequent to the access request time slot;
   wherein the processing unit reserves the third TDMA slot as a grant time slot for receiving any grant of the access request concurrently from the one or more neighbor nodes; and
   wherein the grant time slot is the same time slot as the access request time slot but residing in a third epoch subsequent to the first epoch.

* * * * *